(12) United States Patent
Wang et al.

(10) Patent No.: US 10,257,908 B2
(45) Date of Patent: Apr. 9, 2019

(54) LED DEVICE PROTECTION CIRCUIT AND METHOD THEREOF

(71) Applicant: Sengled Co., Ltd., Shanghai (CN)

(72) Inventors: Yongtao Wang, Shanghai (CN); Junshan Lou, Shanghai (CN); Jinxiang Shen, Shanghai (CN)

(73) Assignee: SENGLED CO., LTD., Shanghai (CN)

( * ) Notice: Subject to any disclaimer, the term of this patent is extended or adjusted under 35 U.S.C. 154(b) by 0 days.

(21) Appl. No.: 15/741,992

(22) PCT Filed: Dec. 7, 2016

(86) PCT No.: PCT/CN2016/108861
§ 371 (c)(1),
(2) Date: Jan. 4, 2018

(87) PCT Pub. No.: WO2017/114114
PCT Pub. Date: Jul. 6, 2017

(65) Prior Publication Data
US 2018/0206301 A1    Jul. 19, 2018

(30) Foreign Application Priority Data
Dec. 30, 2015  (CN) .......................... 2015 1 1024055

(51) Int. Cl.
*H05B 33/08* (2006.01)
*H02H 7/20* (2006.01)

(52) U.S. Cl.
CPC ............ *H05B 33/089* (2013.01); *H02H 7/20* (2013.01); *H05B 33/0887* (2013.01); *Y02B 20/341* (2013.01)

(58) Field of Classification Search
CPC .. H05B 33/0815; H05B 37/02; H05B 33/083; H05B 33/089; H05B 33/0809;
(Continued)

(56) References Cited

U.S. PATENT DOCUMENTS 8,344,638 B2* 1/2013 Shteynberg ........ H05B 33/0815
315/185 S
9,271,345 B2* 2/2016 Welten ................. H05B 33/083
(Continued)

FOREIGN PATENT DOCUMENTS

CN    101795517 A    8/2010
CN    202488803 U    10/2012
(Continued)

OTHER PUBLICATIONS

The World Intellectual Property Organization (WIPO) International search report and written opinion for PCT/CN2016/108861 dated Mar. 21, 2017 pp. 9.
(Continued)

*Primary Examiner* — Haissa Philogene
(74) *Attorney, Agent, or Firm* — Anova Law Group, PLLC

(57) ABSTRACT

LED device protection circuits and protection methods are provided. An exemplary LED device protection circuit includes a first comparator, a protection-signal generating circuit, a sampling-voltage acquisition circuit, and a first reference-voltage acquisition circuit. The first comparator is connected with the sampling-voltage acquisition circuit and the first reference-voltage acquisition circuit, respectively. The first comparator is further connected with the protection-signal generating circuit. The first comparator is configured for comparing a sampling voltage outputted from the sampling-voltage acquisition circuit with a first reference voltage outputted from the first reference-voltage acquisition circuit, and outputting a pulse signal in accordance with a comparison result to the protection-signal generating circuit for generating a protection signal when the pulse signal satisfies a preset condition. The protection signal is configured for turning off an output load connected to a dimmer.

18 Claims, 7 Drawing Sheets

(58) Field of Classification Search
CPC ............ H05B 33/0851; H05B 33/0818; H05B 33/0884; H05B 33/0887; H05B 37/0272; H05B 33/0896; H05B 33/0842; H05B 33/0845; Y02B 20/341; Y02B 20/346; Y02B 20/342
See application file for complete search history.

(56) References Cited

U.S. PATENT DOCUMENTS

| | | | |
|---|---|---|---|
| 9,295,117 B2* | 3/2016 | Acatrinei | H05B 33/0815 |
| 2010/0181833 A1* | 7/2010 | Wu | H05B 33/0815 |
| | | | 307/36 |
| 2017/0150559 A1 | 5/2017 | Wang et al. | |
| 2017/0318633 A1* | 11/2017 | Zijlman | H05B 33/0845 |

FOREIGN PATENT DOCUMENTS

| | | |
|---|---|---|
| CN | 103376370 A | 10/2013 |
| CN | 104619083 A | 5/2015 |
| CN | 105101538 A | 11/2015 |
| CN | 105633911 A | 6/2016 |
| CN | 205565687 U | 9/2016 |

OTHER PUBLICATIONS

European Patent Office (EPO) Extended Search Report for PCT/CN2016/108861 Jan. 16, 2019 10 Pages.

* cited by examiner

LED DEVICE PROTECTION CIRCUIT AND METHOD THEREOF

CROSS-REFERENCES TO RELATED APPLICATIONS

This application is a national phase entry under 35 U.S.C. § 371 of International Application No. PCT/CN2016/108861, filed on Dec. 7, 2016, which claims priority to Chinese Patent Application No. 201511024055.7, filed on Dec. 30, 2015. The above enumerated patent applications are incorporated by reference herein in their entirety.

TECHNICAL FIELD

The present disclosure generally relates to the field of smart control technology and, more particularly, relates to an LED device protection circuit and a related LED device protection method.

BACKGROUND

Many existing indoor lighting power supply systems are connected with dimmers. However, many existing light emitting diodes (LED) driving power supplies are not compatible with the dimmers. If an adjustment of a dimmer goes to a small angle, the lights may not work properly, or the dimmers may be damaged.

Accordingly, it is desirable to provide an LED device protection circuit and a related LED device protection method.

BRIEF SUMMARY

In various embodiments, an LED device protection circuit and a related LED device protection method are provided, e.g., for protecting the LED driving power supply or the LED device when the LED device is connected with a dimmer.

One aspect of the present disclosure provides an LED device protection circuit. The LED device protection circuit includes a first comparator, a protection-signal generating circuit, a sampling-voltage acquisition circuit, and a first reference-voltage acquisition circuit. A first input terminal of the first comparator is connected with an output terminal of the sampling-voltage acquisition circuit. A second input terminal of the first comparator is connected with an output terminal of the first reference-voltage acquisition circuit. An output terminal of the first comparator is connected with an input terminal of the protection-signal generating circuit. The first comparator is configured for comparing a sampling voltage outputted from the sampling-voltage acquisition circuit with a first reference voltage outputted from the first reference-voltage acquisition circuit, and outputting a pulse signal in accordance with a comparison result. The protection-signal generating circuit is configured for receiving the pulse signal outputted from the first comparator, and generating a protection signal when the pulse signal satisfies a preset condition. The protection signal is configured for turning off an output load connected to a dimmer.

Optionally, the first reference voltage outputted by the first reference-voltage acquisition circuit is proportional at a predetermined ratio to an input voltage of the dimmer.

Optionally, the protection-signal generating circuit includes a second comparator, a second reference-voltage acquisition circuit, and a filter circuit; the output terminal of the first comparator is connected with an input terminal of the filter circuit; a first input terminal of the second comparator is connected with an output terminal of the filter circuit; a second input terminal of the second comparator is connected with an output terminal of the second reference-voltage acquisition circuit; and an output terminal of the second comparator is configured for outputting the protection signal.

Optionally, the protection-signal generating circuit includes a single chip microcomputer; the output terminal of the first comparator is connected with an input terminal of the single chip microcomputer; and the single chip microcomputer is configured for outputting the protection signal based on the pulse signal outputted from the first comparator.

Optionally, the LED device protection circuit further includes a rectifier bridge and a power conversion circuit. A first terminal of the dimmer is connected to a first input of the rectifier bridge; a second terminal of the dimmer is connected to a second input of the rectifier bridge; a first output terminal of the rectifier bridge is connected to a first input terminal of the power conversion circuit; and a second output terminal of the rectifier bridge is connected to a second input terminal of the power conversion circuit.

Optionally, an input terminal of the sampling-voltage acquisition circuit is connected to a connection line between the first terminal of the dimmer and the first input terminal of the rectifier bridge.

Optionally, an input terminal of the sampling-voltage acquisition circuit is connected to a connection line between the second terminal of the dimmer and the second input terminal of the rectification bridge.

Optionally, an input terminal of the sampling-voltage acquisition circuit is connected to a connection line between the first output terminal of the rectification bridge and the first input terminal of the power conversion circuit.

Optionally, the sampling-voltage acquisition circuit includes a first resistor and a second resistor that are connected in series; a first terminal of the first resistor is used as an input terminal of the sampling-voltage acquisition circuit; a second terminal of the first resistor is connected in series with a first terminal of the second resistor; and the output terminal of the sampling-voltage acquisition circuit is located on a connection line between the second terminal of the first resistor and the first terminal of the second resistor.

Optionally, an input terminal of the first reference-voltage acquisition circuit is connected to a connection line between the first terminal of the dimmer and the first input terminal of the rectifier bridge.

Optionally, an input terminal of the first reference-voltage acquisition circuit is connected to a connection line between the second terminal of the dimmer and the second input terminal of the rectifier bridge.

Optionally, an input terminal of the first reference-voltage acquisition circuit is connected to a connection line between the first output terminal of the rectification bridge and the first input terminal of the power conversion circuit.

Optionally, the first reference-voltage acquisition circuit includes a first diode, a third resistor, a fourth resistor, and a first capacitor; a first terminal of the first diode is used as an input terminal of the first reference-voltage acquisition circuit; a first terminal of the third resistor is connected with a second terminal of the first diode; a first terminal of the fourth resistor is connected in series with a second terminal of the third resistor; the first capacitor is connected in parallel with the third resistor and the fourth resistor; and an output of the first reference-voltage acquisition circuit is located on a connection line between a second terminal of the third resistor and a first terminal of the fourth resistor.

Optionally, the LED device protection circuit further includes a first load and a first load control circuit, connected in series. A first input terminal of the first load is connected with an output terminal of the protection-signal generating circuit; an output terminal of the first load is connected with the first load control circuit; and the first load is configured for supplying a power to the dimmer when the protection signal turns off the output load connected to the dimmer.

Optionally, a second input terminal of the first load is connected to a connection line between the first terminal of the dimmer and the first input of the rectifier bridge.

Optionally, a second input terminal of the first load is connected to a connection line between the second terminal of the dimmer and the second input of the rectifier bridge.

Optionally, a second input terminal of the first load is connected to a connection line between the first output terminal of the rectifier bridge and the first input terminal of the power conversion circuit.

Another aspect of the present disclosure provides an LED device protection method including: receiving, by a first comparator, a sampling voltage collected by sampling-voltage acquisition circuit, and a first reference voltage collected by a first reference-voltage acquisition circuit; comparing, by the first comparator, the sampling voltage with the first reference voltage to obtain a pulse signal; sending, by the first comparator, the pulse signal to a protection-signal generating circuit; and receiving, by the protection-signal generating circuit, the pulse signal outputted from the first comparator, and generating a protection signal when the pulse signal satisfies a preset condition.

Optionally, for generating a protection signal when the pulse signal satisfies a preset condition, a filter circuit filters the pulse signal to obtain a comparison voltage; and a second comparator compares the comparison voltage with a second reference voltage collected by a second reference-voltage acquisition circuit to obtain the protection signal.

Optionally, for generating a protection signal when the pulse signal satisfies a preset condition, a single chip microcomputer determines whether a pulse width of the pulse signal is smaller than a preset value, and outputs the protection signal based on the determination.

Other aspects of the present disclosure can be understood by those skilled in the art in light of the description, the claims, and the drawings of the present disclosure.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the present disclosure, reference will now be made in detail to exemplary embodiments of the present disclosure, which are illustrated in the accompanying drawings. Wherever possible, the same reference numbers will be used throughout the drawings to refer to the same or like parts.

In accordance with various embodiments, the present disclosure provides an LED device protection circuit, and a related LED device protection method. The disclosed LED device protection circuit may be used for protecting the LED driving power supply or the LED device when the LED device is connected with a dimmer.

Figure 1:
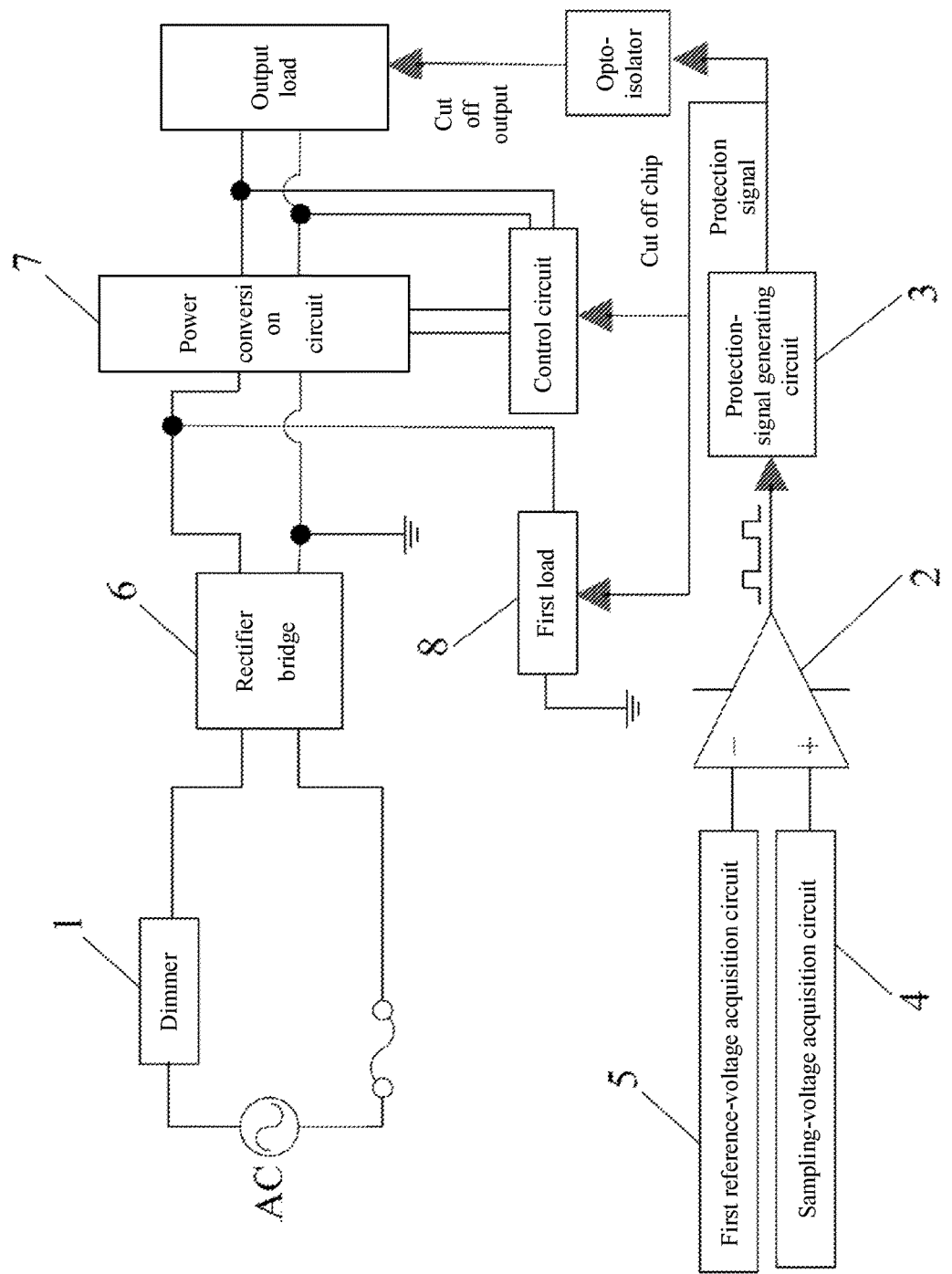
FIG. 1 is a schematic structural diagram of an exemplary LED device protection circuit in accordance with various embodiments of the present disclosure.

Referring to FIG. 1, a schematic structural diagram of an exemplary LED device protection circuit is shown in accordance with various embodiments of the present disclosure.

The illustrated protection circuit can be used to protect an LED driving power supply or an LED device after connecting to a dimmer 1. The protection circuit can include a first comparator 2, a protection-signal generating circuit 3, a sampling-voltage acquisition circuit 4, and a first reference-voltage acquisition circuit 5.

A first input terminal of the first comparator 2 is connected with an output terminal of the sampling-voltage acquisition circuit 4. A second input terminal of the first comparator 2 is connected with an output terminal of the first reference-voltage acquisition circuit 5. An output terminal of the first comparator 2 is connected to an input terminal of the protection-signal generating circuit 3.

The first comparator 2 can be used for comparing a sampling voltage, outputted from the sampling-voltage acquisition circuit 4, with a first reference voltage, outputted from the first reference-voltage acquisition circuit 5, and used for outputting a pulse signal in accordance with the comparison result.

The protection-signal generating circuit 3 can be used for receiving the pulse signal outputted from the first comparator 2 and generating a protection signal for turning off the output load connected to the dimmer 1 when the pulse signal satisfies a preset condition.

Specifically, the first input terminal of the first comparator 2 is an in-phase terminal of the first comparator 2, and the second input terminal of the first comparator 2 is an inverting terminal of the first comparator 2. That is, the output terminal of the sampling-voltage acquisition circuit 4 is connected to the in-phase terminal of the first comparator 2, and the output terminal of the first reference-voltage acquisition circuit 5 is connected to the inverting terminal of the first comparator 2.

In some implementations, when the angle of the dimmer 1 becomes small, a portion of the input sine wave can be cut off by the dimmer 1. That is, the voltage signal outputted from the dimmer 1 can be changed. After turning the angle of the dimmer 1 to a smaller angle, a sampled voltage can be collected by sampling-voltage acquisition circuit 4. At the same time, a reference voltage can be collected by the first reference-voltage acquisition circuit 5. A comparison of the sampling voltage and the reference voltage can be made by the first comparator 2 to generate a pulse signal.

It should be noted that, a smaller the angle of the dimmer 1 can result in a smaller duty ratio of the pulse signal. Accordingly, the protection-signal generating circuit 3 can detect an angle changing degree of the dimmer based on the pulse signal. When the angle of the dimmer is reduced to a threshold value, the protection-signal generating circuit 3 can output a protection signal to turn off the output load or turn off output load control circuit. As such, the output load and the dimmer can be protected. In some embodiments, in order to prevent high voltages from affecting the system, when the protection signal is used to turn off the output load, the protections signal can be transferred by an opto-isolator to realize an electrical isolation between the output load and the protection-signal generating circuit.

It should be noted that, the first reference voltage collected by the first reference-voltage acquisition circuit 5 is not fixed and may be changed as a peak value of the input voltage of the dimmer changes. Specifically, the first reference voltage and the peak value of the input voltage may have a preset ratio, and the preset ratio can be set according to actual needs.

As such, when the input voltage changes, the duty ratio of the pulse signal outputted from the first comparator 2 does not vary greatly. If the first reference voltage is fixed, the duty ratio of the pulse signal changes as the input voltage changes, so that the angle of the dimmer detected by the protection-signal generating circuit 3 also changes, which is unfavorable for protection. Therefore, in order to eliminate the adverse effect of the change of the input voltage on the detection result, the first reference voltage is designed to vary with the peak value of the input voltage.

Accordingly, in the present disclosure, corresponding to a state of the dimmer angle, the protection circuit of the LED device can generate a pulse signal through the first comparator, and check the pulse signal by the protection-signal generating circuit, and can generate a protection signal when the pulse signal satisfies a preset condition. Thus, the output load can be turned off when the dimmer angle becomes smaller, so that the dimmer and the output load can be effectively protected.

Figure 2:
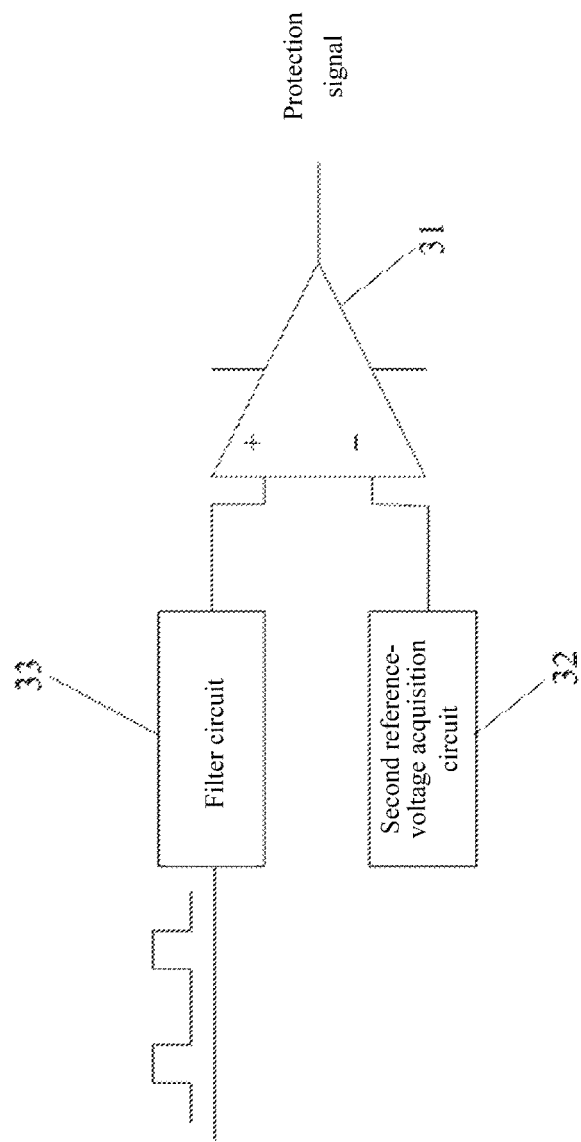
FIG. 2 is a schematic structural diagram of another exemplary LED device protection circuit in accordance with various embodiments of the present disclosure.

Referring to FIG. 2, a schematic structural diagram of another exemplary LED device protection circuit is shown in accordance with various embodiments of the present disclosure.

As illustrated, the protection-signal generating circuit 3 can include a second comparator 31, a second reference-voltage acquisition circuit 32, and a filter circuit 33.

The output terminal of the first comparator 2 discussed above in connection with FIG. 1 is connected to the input terminal of the protection-signal generating circuit 3. That is, the output terminal of the first comparator 2 is connected to an input terminal of the filter circuit 33. A first input terminal of the second comparator 31 is connected to the output terminal of the filter circuit 33. A second input terminal of the second comparator 31 is connected to an output terminal of the second reference-voltage acquisition circuit 32.

The output terminal of the second comparator 31 can be used for outputting the protection signal.

Specifically, the pulse signal outputted from the first comparator 2 can be filtered by the filter circuit 33 to generate a corresponding voltage. The voltage can be compared with a second reference voltage collected by the second reference-voltage acquisition circuit 32. If the voltage generated by the filter circuit 33 is less than the second reference voltage, it can be determined that the dimmer angle is smaller than a certain extent. At this time, a protection signal can be outputted from the output terminal of the second comparator 31.

In some embodiments, the protection signal can be a low level signal. In some other embodiments, the protection signal can be a high level signal according to actual needs of specific settings. However, for the convenience of the description, the protection signal is set as a low level signal as an example in the following description.

Referring to FIGS. 1 and 2, the low level signal can be outputted to the output load or the control circuit of the output load. The output load or the control circuit of the output load can be automatically turned off under a trigger of the low-level signal.

It should be noted that, the second reference voltage collected by the second reference-voltage acquisition circuit 32 is a voltage value corresponding to the dimmer angle. When the second comparator 31 detects that the voltage value corresponding to the pulse signal has reached the second reference voltage value, the protection signal can be outputted. The second reference-voltage acquisition circuit 32 can be flexibly arranged as required and is not specifically limited. A correspondence relationship between the second reference voltage and the dimmer angle can be obtained based on actual experience values.

Figure 3:
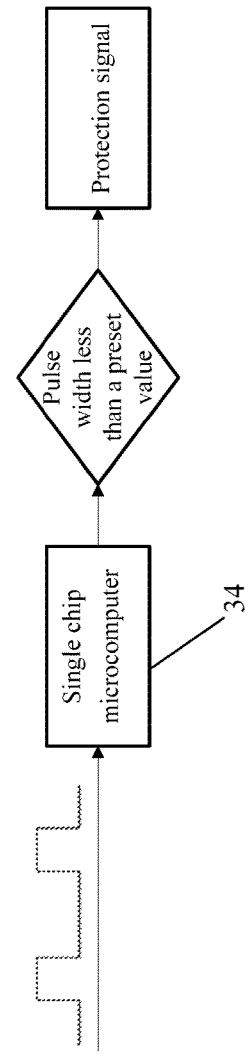
FIG. 3 is a schematic structural diagram of another exemplary LED device protection circuit in accordance with various embodiments of the present disclosure.

Referring to FIG. 3, a schematic structural diagram of another exemplary LED device protection circuit is shown in accordance with various embodiments of the present disclosure.

As illustrated, another structure of the protection-signal generating circuit 3 can include a single chip microcomputer 34. Accordingly, the output terminal of the first comparator 2 as shown in FIG. 1 can be connected to an input terminal of the single chip microcomputer 34.

The single chip microcomputer 34 can be used for outputting the protection signal in accordance with the pulse signal outputted from the first comparator 2.

Specifically, when the single chip microcomputer 34 receives the pulse signal outputted from the first comparator 2, a pulse width of the pulse signal can be checked. If the pulse width is less than a preset value, it indicates that the dimmer angle is small. In this case, a protection signal such as a low level signal can be outputted. The subsequent processes can be the same as described above in connection with FIG. 2.

It should be noted that, the preset value and the dimmer angle also have a correspondence relationship, which can ensure that the protection signal is outputted when the pulse signal reaches the preset value.

Figure 4:
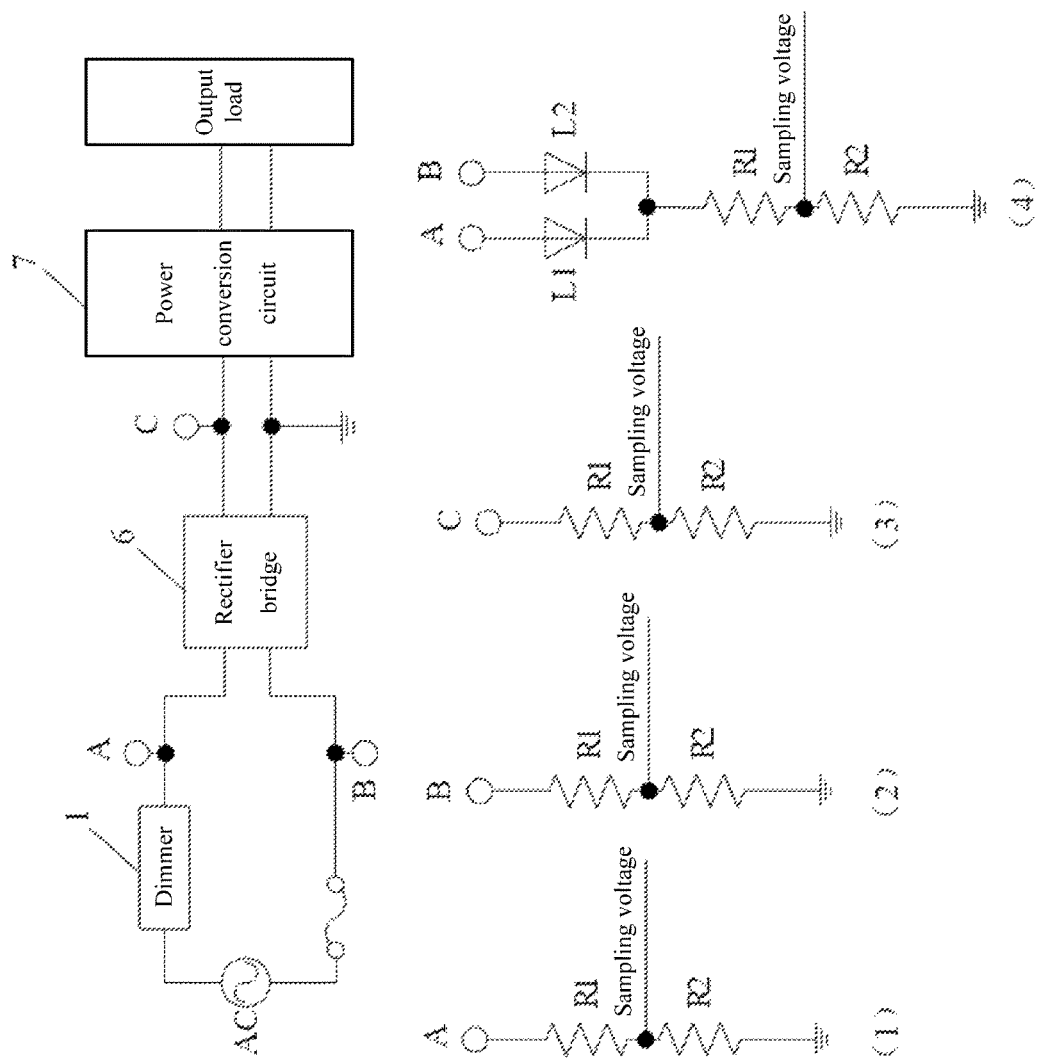
FIG. 4 is a schematic structural diagram of another exemplary LED device protection circuit in accordance with various embodiments of the present disclosure.

Turning to FIG. 4, a schematic structural diagram of another exemplary LED device protection circuit is shown in accordance with various embodiments of the present disclosure.

Referring to FIGS. 1 and 4, the LED device protection circuit can further include a rectifier bridge 6 and a power conversion circuit 7.

Accordingly, the first terminal of the dimmer 1 is connected to a first input terminal of the rectifier bridge 6. The second terminal of the dimmer 1 is connected to a second input terminal of the rectifier bridge 6. A first output terminal of the rectifier bridge 6 is connected to a first input terminal of the power conversion circuit 7. A second output terminal of the rectifier bridge 6 is connected to a second input terminal of the power conversion circuit 7.

In some embodiments, an input terminal of the sampling-voltage acquisition circuit 4 is connected to a connection line between the first terminal of the dimmer 1 and the first input terminal of the rectifier bridge 6, e.g., at node A shown in FIG. 4.

In some other embodiments, the input terminal of the sampling-voltage acquisition circuit 4 is connected to a connection line between the second terminal of the dimmer 1 and the second input terminal of the rectifier bridge 6, e.g., at node B shown in FIG. 4.

In some other embodiments, the input terminal of the sampling-voltage acquisition circuit 4 is connected to a connection line between the first output terminal of the rectifier bridge 6 and the first input terminal of the power conversion circuit 7, e.g., at node C shown in FIG. 4.

The node A and node B are arbitrary points on the two lines, between the dimmer 1 and the rectifier bridge 6, e.g., after the dimmer 1 and before the rectifier bridge 6. The node C is an arbitrary point, between the rectifier bridge 6 and the power conversion circuit 7, e.g., after the rectifier bridge 6 and before the power conversion circuit 7.

The sampled voltage is a cut off voltage after the dimmer 1, regardless the input terminal of the sampling-voltage acquisition circuit 4 is connected to node A, node B or node C.

Referring to circuits (1), (2) and (3) in FIG. 4, the sampling-voltage acquisition circuit 4 can include a first resistor R1, and a second resistor R2 connected in series with the first resistor R1.

A first terminal of the first resistor R1 can be served as an input terminal of the sampling-voltage acquisition circuit 4.

A second terminal of the first resistor R1 is connected in series with a first terminal of the second resistor R2. An output terminal of the sampling-voltage acquisition circuit 4 is located on a connection line between the second terminal of the first resistor R1 and the first terminal of the second resistor R2.

It should be noted that, circuits (1), (2) and (3) in FIG. 4 differ only in the input terminals, and the remaining internal structures may be identical according to various embodiments of the present disclosure.

Specifically, the sampling-voltage acquisition circuit 4 can use a divided voltage, after divided by the first resistor R1 and the second resistor R2, as the sampling voltage of the first comparator 2.

Further, in some other embodiments, the sampling-voltage acquisition circuit 4 can also have a configuration as described in circuit (4) in FIG. 4. As illustrated, the sampling-voltage acquisition circuit 4 can include two diodes L1 and L2, a first resistor R1 and a second resistor R2.

One terminal of the diode L1 and one terminal of the diode L2 can be connected to the nodes A and B respectively as input terminals of the sampling-voltage acquisition circuit 4. The other terminals of the two diodes L1 and L2 can be connected to a first terminal of the first resistor R1. A second terminal of the first resistor R1 is connected in series with a first terminal of the second resistor R2. An output terminal of the sampling-voltage acquisition circuit 4 can be located on a connection line between the second terminal of the first resistor R1 and the first terminal of the second resistor R2.

Figure 5:
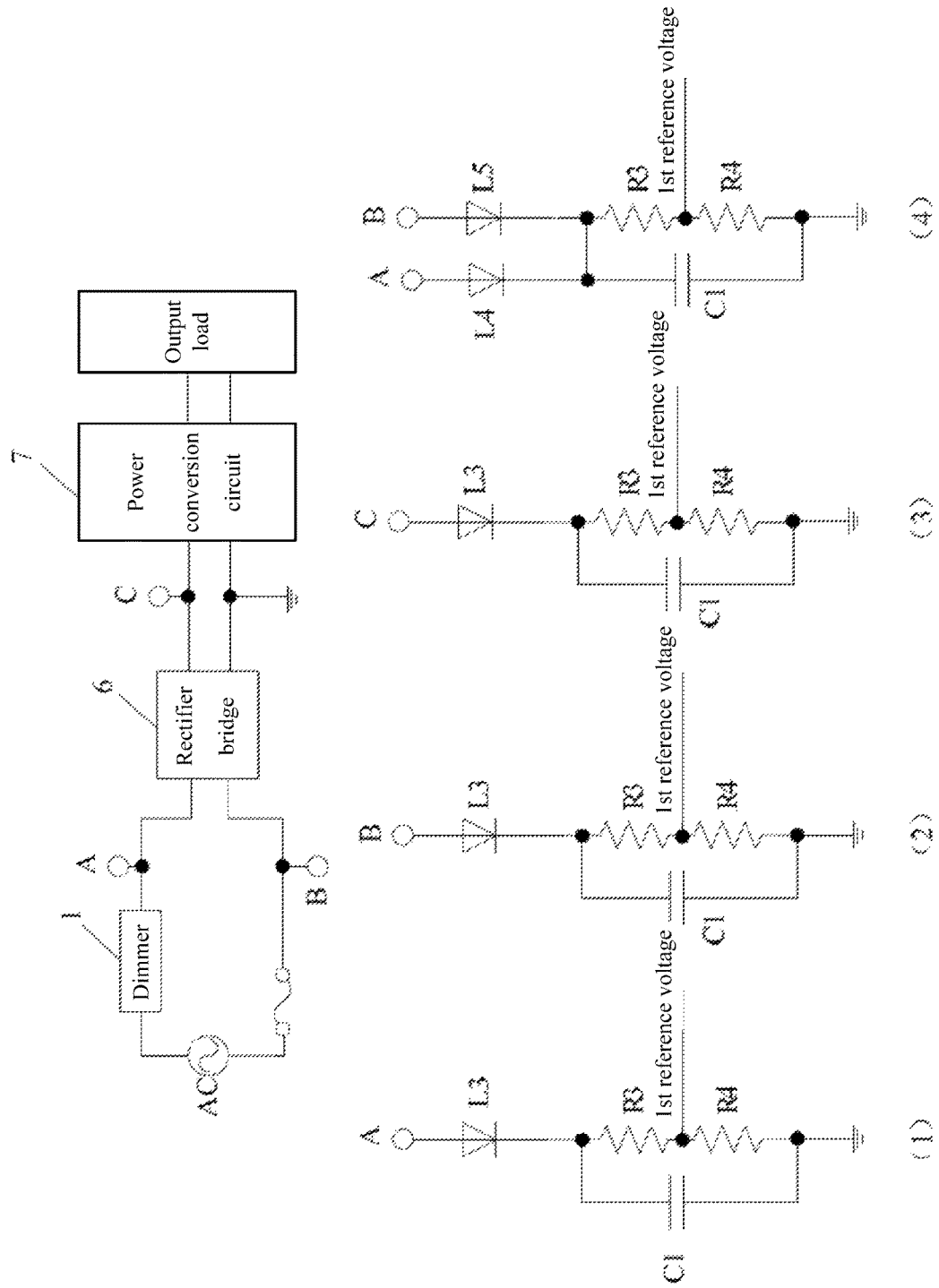
FIG. 5 is a schematic structural diagram of another exemplary LED device protection circuit in accordance with various embodiments of the present disclosure.

Referring to FIG. 5, a schematic structural diagram of another exemplary LED device protection circuit is shown in accordance with various embodiments of the present disclosure.

As illustrated, in some embodiments, the input terminal of the first reference-voltage acquisition circuit 5 is connected to the connection line between the first terminal of the dimmer 1 and the first input terminal of the rectifier bridge 6, e.g., at node A shown in FIG. 5.

In some other embodiments, the input terminal of the first reference-voltage acquisition circuit 5 is connected to the connection line between the second terminal of the dimmer 1 and the second input terminal of the rectifier bridge 6, e.g., at node B shown in FIG. 5.

In some other embodiments, the input terminal of the first reference-voltage acquisition circuit 5 is connected to the connection line between the first output terminal of the rectifier bridge 6 and the first input terminal of the power conversion circuit 7, e.g., at node C shown in FIG. 5.

The nodes A, B and C shown in FIG. 5 have the same meanings as those of the nodes A, B and C shown in FIG. 4.

Further, referring to circuits (1), (2) and (3) in FIG. 5, the first reference-voltage acquisition circuit 5 can include a first diode L3, a third resistor R3, a fourth resistor R4, and a first capacitor C1.

A first terminal of the first diode L3 can be served as the input terminal of the first reference-voltage acquisition circuit 5.

A first terminal of the third resistor R3 is connected to a second terminal of the first diode L3. A first terminal of the fourth resistor R4 and a second terminal of the third resistor R3 can be connected in series.

The first capacitor C1 is connected in parallel with the third resistor R3 and the fourth resistor R4.

The output terminal of the first reference-voltage acquisition circuit 5 is located on a connection line between the second terminal of the third resistor R3 and the first terminal of the fourth resistor R4.

It should be noted that, circuits (1), (2) and (3) in FIG. 5 differ only in the input terminals, and the remaining internal structures may be identical.

Specifically, the first reference-voltage acquisition circuit 5 can obtain a peak value of the input voltage through the first diode L3 and the first capacitor C1, and can provide the first reference voltage to the first comparator 2A, after a voltage dividing through the third resistor R3 and the fourth resistor R4.

Further, in some other embodiments, the first reference-voltage acquisition circuit 5 may also have a configuration as shown in circuit (4) of FIG. 5. As illustrated, the first reference-voltage acquisition circuit 5 can include a second diode L4, a third diode L5, a third resistor R3, a fourth resistor R4, and a first capacitor C1.

One end of the second diode L4 and one end of the third diode L5 can be connected to the nodes A and B respectively as input terminals of the first reference-voltage acquisition circuit 5.

An output terminal of the second diode L4 can be simultaneously connected to a first terminal of the first capacitor C1 and a first terminal of the third resistor R3. An output terminal of the third diode L5 can also be simultaneously connected to the first terminal of the first capacitor C1 and the first terminal of the third resistor R3.

A second terminal of the third resistor R3 is connected in series with a first terminal of the fourth resistor R4. The first capacitor C1 is connected in parallel with the third resistor R3 and the fourth resistor R4.

The output terminal of the first reference-voltage acquisition circuit 5 is located on a connection line between the second terminal of the third resistor R3 and the first terminal of the fourth resistor R4.

Figure 6:
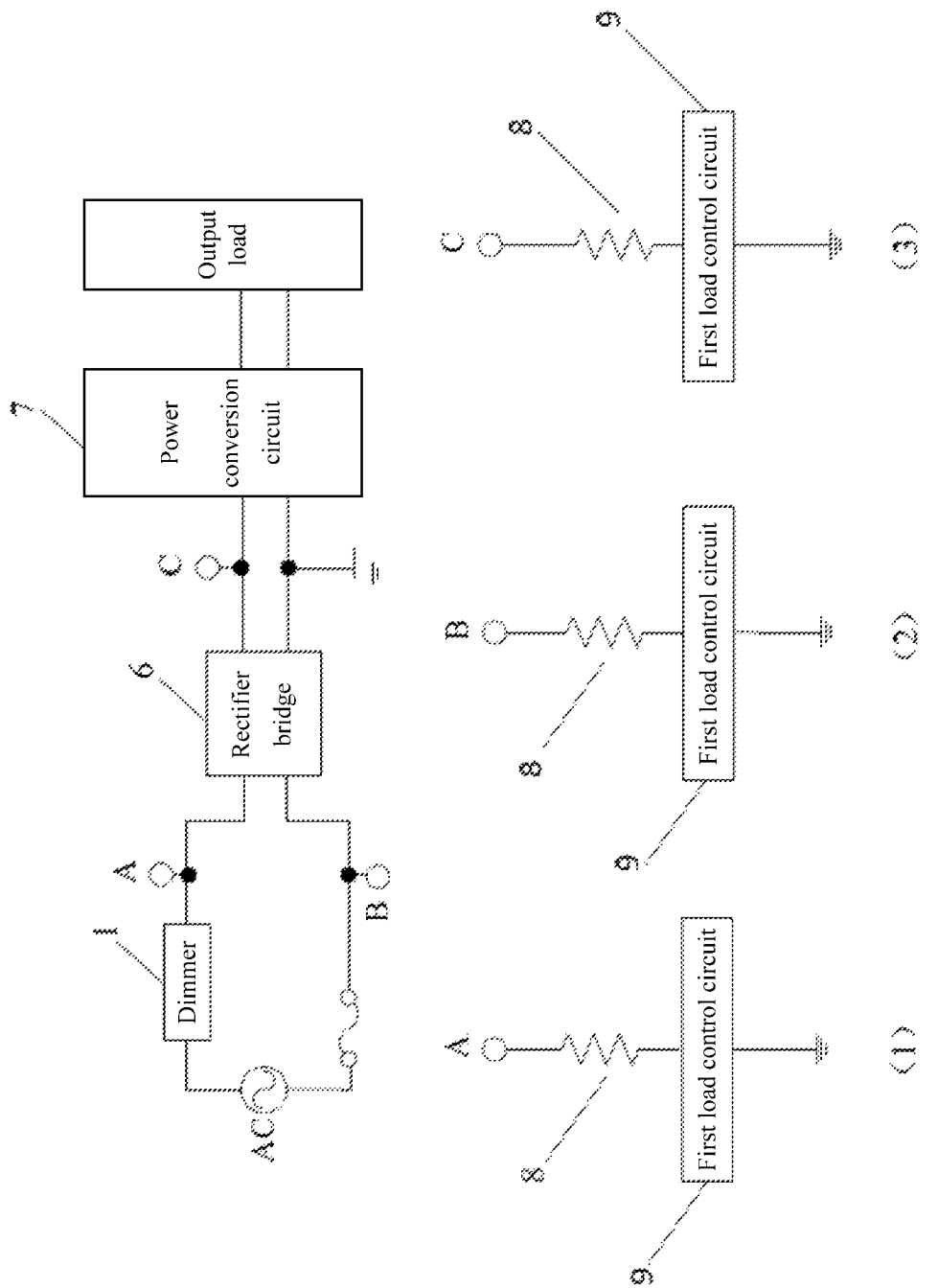
FIG. 6 is a schematic structural diagram of another exemplary LED device protection circuit in accordance with various embodiments of the present disclosure.

Turning to FIG. 6, a schematic structural diagram of another exemplary LED device protection circuit is shown in accordance with various embodiments of the present disclosure. Referring to FIGS. 6 and 1, the LED device protection circuit can further include a first load 8, and a first load control circuit 9 connected in series with the first load 8.

A first input terminal of the first load 8 can be connected to the output terminal of the protection-signal generating circuit 3.

In some embodiments, a second input terminal of the first load 8 can be connected to a connection line between the first terminal of the dimmer 1 and the first input terminal of the rectifier bridge 6, e.g., at node A shown in FIG. 6.

In some other embodiments, the second input terminal of the first load 8 can be connected to a connection line between the second terminal of the dimmer 1 and the second input terminal 5 of the rectifier bridge 6, e.g., at node B shown in FIG. 6.

In some other embodiments, the second input terminal of the first load 8 can be connected to a connection line between the first output terminal of the rectifier bridge 6 and the first input terminal of the power conversion circuit 7, e.g., at node C shown in FIG. 6.

An output terminal of the first load 8 can be connected to the first load control circuit 9.

The first load 8 can be used for supplying power to the dimmer 1 when the protection signal turns off the output load connected to the dimmer 1.

It should be noted that, circuits (1), (2), and (3) in FIG. 6 differ only in the input terminals, and the remaining internal structures may be identical.

In some embodiments, the first load 8 may specifically be a resistor.

When the angle of the dimmer 1 becomes small, the protection-signal generating circuit 3 outputs a protection signal to turn off the output load or the control circuit of the output load. After shutdown, the output load circuit does not have a current through to keep the dimmer in operation. In order to ensure the normal operation of the dimmer after the output load is turned off, in some embodiment, the first load 8 can be added to the LED device protection circuit. When the output load is turned off, the first load 8 can normally supply power to provide a sustaining current to the dimmer 1, ensuring the normal operation of the dimmer 1.

Specifically, when the protection-signal generating circuit 3 outputs the protection signal, a voltage can be applied to both terminals of the first load 8 through the first load control circuit 9 in series with the first load to supply a sustaining current to the dimmer 1.

Figure 7:
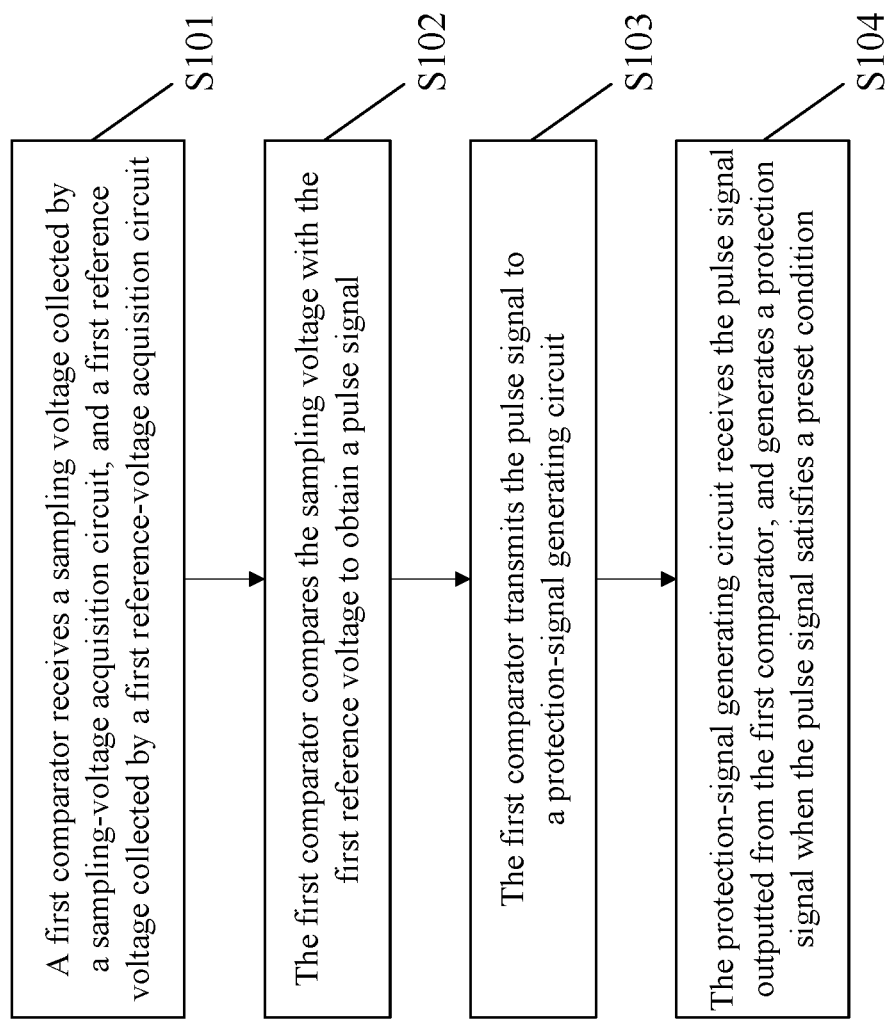
FIG. 7 is a schematic flowchart of an exemplary LED device protection method in accordance with various embodiments of the present disclosure.

Referring to FIG. 7, a schematic flowchart of an exemplary LED device protection method is shown in accordance with various embodiments of the present disclosure.

The disclosed method can be applied to the disclosed LED device protection circuit described above. The LED device protection circuit can include a first comparator and a protection-signal generating circuit. As illustrated, the method can include the following steps.

At step S101, the first comparator can receive a sampling voltage collected by a sampling voltage collecting circuit, and a first reference voltage collected by a first reference voltage collecting circuit.

At step S102, the first comparator can compare the sampling voltage with the first reference voltage to obtain a pulse signal.

At step S103, the first comparator can transmit the pulse signal to the protection-signal generating circuit.

At step S104, the protection-signal generating circuit can receive the pulse signal outputted from the first comparator, and can generate a protection signal when the pulse signal satisfies a preset condition.

The specific implementation details of the disclosed method may be referred to the foregoing embodiments described above with the disclosed LED device protection circuit.

Figure 8:
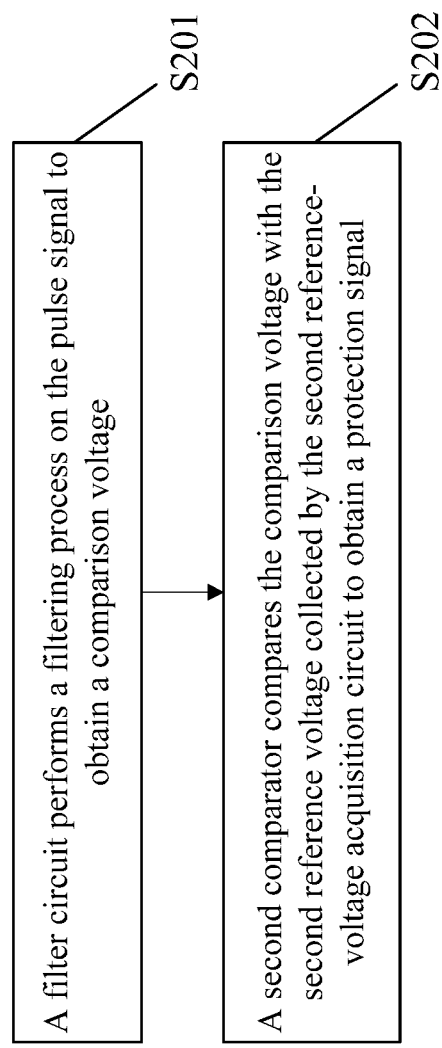
FIG. 8 is a schematic flowchart of another exemplary LED device protection method in accordance with various embodiments of the present disclosure.

Referring to FIG. 8, a schematic flowchart of another exemplary LED device protection method is shown in accordance with various embodiments of the present disclosure.

The protection-signal generating circuit can include a second comparator, a second reference-voltage acquisition circuit, and a filter circuit.

The above-described step S104 can concretely include the following steps.

At step S201, the filter circuit can perform a filtering process on the pulse signal to obtain a comparison voltage.

At step S202, the second comparator can compare the comparison voltage with the second reference voltage collected by the second reference-voltage acquisition circuit to obtain a protection signal.

In some other embodiments, the protection-signal generating circuit can include a single chip microcomputer. Accordingly, the above-described step S104 can concretely include that the single chip microcomputer determines whether a pulse width of the pulse signal is smaller than a preset value and outputs a protection signal in accordance with the determination result.

The descriptions of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, an LED device protection circuit, and a related LED device protection method are provided.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. An LED device protection circuit, comprising:
 a first comparator, a protection-signal generating circuit, a sampling-voltage acquisition circuit, and a first reference-voltage acquisition circuit, wherein:

a first input terminal of the first comparator is connected with an output terminal of the sampling-voltage acquisition circuit;
a second input terminal of the first comparator is connected with an output terminal of the first reference-voltage acquisition circuit;
an output terminal of the first comparator is connected with an input terminal of the protection-signal generating circuit;
the first comparator is configured for comparing a sampling voltage outputted from the sampling-voltage acquisition circuit with a first reference voltage outputted from the first reference-voltage acquisition circuit, and outputting a pulse signal in accordance with a comparison result;
the protection-signal generating circuit is configured for receiving the pulse signal outputted from the first comparator, and generating a protection signal when the pulse signal satisfies a preset condition, wherein:
the protection-signal generating circuit includes a second comparator, a second reference-voltage acquisition circuit, and a filter circuit;
the output terminal of the first comparator is connected with an input terminal of the filter circuit;
a first input terminal of the second comparator is connected with an output terminal of the filter circuit;
a second input terminal of the second comparator is connected with an output terminal of the second reference-voltage acquisition circuit; and
an output terminal of the second comparator is configured for outputting the protection signal; and
the protection signal is configured for turning off an output load connected to a dimmer.

2. The LED device protection circuit of claim 1, wherein the first reference voltage outputted by the first reference-voltage acquisition circuit is proportional at a predetermined ratio to an input voltage of the dimmer.

3. The LED device protection circuit of claim 1, further comprising:
a rectifier bridge and a power conversion circuit, wherein:
a first terminal of the dimmer is connected to a first input of the rectifier bridge;
a second terminal of the dimmer is connected to a second input of the rectifier bridge;
a first output terminal of the rectifier bridge is connected to a first input terminal of the power conversion circuit; and
a second output terminal of the rectifier bridge is connected to a second input terminal of the power conversion circuit.

4. The LED device protection circuit of claim 1, wherein:
the protection-signal generating circuit includes a single chip microcomputer;
the output terminal of the first comparator is connected with an input terminal of the single chip microcomputer;
the single chip microcomputer is configured for outputting the protection signal based on the pulse signal outputted from the first comparator; and
the second comparator, the second reference-voltage acquisition circuit, and the filter circuit are implemented by the single chip microcomputer.

5. The LED device protection circuit of claim 3, further comprising:
a first load and a first load control circuit, connected in series, wherein:

a first input terminal of the first load is connected with an output terminal of the protection-signal generating circuit;
an output terminal of the first load is connected with the first load control circuit; and
the first load is configured for supplying a power to the dimmer when the protection signal turns off the output load connected to the dimmer.

6. The LED device protection circuit of claim 3, wherein:
an input terminal of the sampling-voltage acquisition circuit is connected to a connection line between the first terminal of the dimmer and the first input terminal of the rectifier bridge.

7. The LED device protection circuit of claim 3, wherein:
an input terminal of the sampling-voltage acquisition circuit is connected to a connection line between the second terminal of the dimmer and the second input terminal of the rectifier bridge.

8. The LED device protection circuit of claim 3, wherein:
an input terminal of the sampling-voltage acquisition circuit is connected to a connection line between the first output terminal of the rectifier bridge and the first input terminal of the power conversion circuit.

9. The LED device protection circuit of claim 3, wherein:
the sampling-voltage acquisition circuit includes a first resistor and a second resistor that are connected in series;
a first terminal of the first resistor is used as an input terminal of the sampling-voltage acquisition circuit;
a second terminal of the first resistor is connected in series with a first terminal of the second resistor; and
the output terminal of the sampling-voltage acquisition circuit is located on a connection line between the second terminal of the first resistor and the first terminal of the second resistor.

10. The LED device protection circuit of claim 3, wherein:
an input terminal of the first reference-voltage acquisition circuit is connected to a connection line between the first terminal of the dimmer and the first input terminal of the rectifier bridge.

11. The LED device protection circuit of claim 3, wherein:
an input terminal of the first reference-voltage acquisition circuit is connected to a connection line between the second terminal of the dimmer and the second input terminal of the rectifier bridge.

12. The LED device protection circuit of claim 3, wherein:
an input terminal of the first reference-voltage acquisition circuit is connected to a connection line between the first output terminal of the rectifier bridge and the first input terminal of the power conversion circuit.

13. The LED device protection circuit of claim 9, wherein:
the first reference-voltage acquisition circuit includes a first diode, a third resistor, a fourth resistor, and a first capacitor;
a first terminal of the first diode is used as an input terminal of the first reference-voltage acquisition circuit;
a first terminal of the third resistor is connected with a second terminal of the first diode;
a first terminal of the fourth resistor is connected in series with a second terminal of the third resistor;
the first capacitor is connected in parallel with the third resistor and the fourth resistor; and an output of the first reference-voltage acquisition circuit is located on a connection line between a second terminal of the third resistor and a first terminal of the fourth resistor.

14. The LED device protection circuit of claim 5, wherein:
   a second input terminal of the first load is connected to a connection line between the first output terminal of the rectifier bridge and the first input terminal of the power conversion circuit.

15. The LED device protection circuit of claim 5, wherein:
   a second input terminal of the first load is connected to a connection line between the first terminal of the dimmer and the first input of the rectifier bridge.

16. The LED device protection circuit of claim 5, wherein:
   a second input terminal of the first load is connected to a connection line between the second terminal of the dimmer and the second input of the rectifier bridge.

17. An LED device protection method, comprising:
   receiving, by a first comparator, a sampling voltage collected by a sampling-voltage acquisition circuit, and a first reference voltage collected by a first reference-voltage acquisition circuit;
   comparing, by the first comparator, the sampling voltage with the first reference voltage to obtain a pulse signal;
   sending, by the first comparator, the pulse signal to a protection-signal generating circuit;
   receiving, by the protection-signal generating circuit, the pulse signal outputted from the first comparator, and generating a protection signal when the pulse signal satisfies a preset condition;
   filtering, by a filter circuit, the pulse signal to obtain a comparison voltage; and
   comparing, by a second comparator, the comparison voltage with a second reference voltage collected by a second reference-voltage acquisition circuit to obtain the protection signal.

18. The LED device protection method of claim 17, wherein generating a protection signal when the pulse signal satisfies a preset condition includes:
   determining, by a single chip microcomputer, whether a pulse width of the pulse signal is smaller than a preset value, and outputting the protection signal based on the determination.

* * * * *